INVENTOR
EDWARD C. FRANK

BY Matthew P. Lynch

ATTORNEY

June 2, 1970  E. C. FRANK  3,515,485
BLADE TRACKING SYSTEM
Filed Dec. 29, 1966  2 Sheets-Sheet 2

INVENTOR
EDWARD C. FRANK

BY *Matthew P. Lynch*

ATTORNEY

United States Patent Office 3,515,485
Patented June 2, 1970

3,515,485
BLADE TRACKING SYSTEM
Edward C. Frank, Glenolden, Pa., assignor to The Boeing Company, Seattle, Wash., a corporation of Delaware
Filed Dec. 29, 1966, Ser. No. 605,698
Int. Cl. G01b 11/26
U.S. Cl. 356—152                                    11 Claims

ABSTRACT OF THE DISCLOSURE

A helicopter mounted blade tracking system for indicating the displacement characteristics of the planes of rotation of rotating helicopter blades. The blade tracking system directs a defined beam of coherent energy, such as a beam of coherent light, upwardly, from the fuselage of the helicopter, and into the planes of rotation of the blades. A signal generating energy sensitive element is mounted near the tip of each blade and receives the beam of energy only when the blade is describing a specific plane of rotation relative to the angular direction of the beam. Upon alignment of the element in a blade with the beam, a signal is generated, and the displacement characteristics of the blade with respect to an established plane of reference can be determined from the angular direction of that beam with the plane of reference.

---

This invention relates to a system for determining the characteristics of rotating blades, and more particularly to an aircraft mounted system for monitoring the displacement characteristics of rotating blades using a defined beam of energy.

It is necessary to determine the characteristics of rotating blades, and more particularly of helicopter blades during actual rotation. Variations in the rotating characteristics of the blades can create an unbalance in the rotor system leading to excessive and undesirable vibration during operation of the helicopter.

The rotating characteristics of blades can vary depending upon physical differences in the shape of the blades, the material of which they are constructed, the distribution of weight throughout the blade, and the way in which the blades are mounted to the rotor hub of the helicoper. As the angular velocity of the rotating blades increases, the outboard end of the blades tend to cone upwardly, with the tip of each blade describing a specific plane or path of rotation. It is to be understood that the plane of rotation of the blades, as used in the specification and claims, is intended to refer to the plane described by a point on the whirling blades, such as the tip of the blades. The plane of rotation of the tip of each blade depends upon the characteristics of the blade, and a difference in the plane of rotation between one blade and another can create an unbalance in the helicopter rotor system which gives rise to undesirable vibration.

It is therefore necessary that each blade describe a similar or common plane of rotation to prevent excessive vibration of the aircraft. This procedure is commonly referred to as "blade tracking" in which the individual blades are tracked to determine their plane of rotation relative to an established or optimum plane of reference. When all of the blades rotate in a preselected plane of rotation or at the same distance from an established plane of reference, they are all said to be "in track."

Many systems for tracking helicopter blades have been developed in the past, but most of these systems are limited to use when the rotor blades are rotated by a whirl tower where the individual blades can be readily adjusted until they rotate at a common plane of rotation.

It is also desirable, however, to monitor the characteristics of rotating blades during flight so that any changes in the physical structure of the blades which may occur during flight and which may affect their rotating characteristics can be detected. Thus, there is a need for an inflight monitoring system. Such a system should preferably be capable of tracking the blades both while the helicopter is in flight and also while it is on the groond, so that monitoring of the blades can be accomplished under actual operating conditions.

Factors which may influence the plane of rotation of the blades during flight and cause an unbalance in the rotor system leading to excessive vibration of the aircraft include, for example, an accumulation of ice on the blades. Such an accumulation of ice increases and changes the distribution of the weight of the blades and varies their planes of rotation. Another problem is the susceptibility of the rapidly moving blades to contact with foreign objects in the air which may either dent a blade or remove a piece from it, thereby changing its aerodynamic characteristics and causing a variation in the plane of rotation of the blade.

While it is sometimes possible for the pilot of the aircraft to feel the vibration resulting from unbalance in the rotor, it is desirable to provide a system that can accurately detect even minor variations in the tracking characteristics of the blades. Appropriate measures to correct the unbalance can then be taken, such as descending to lower altitudes to clear the blades of ice, or landing to replace or repair the damaged blade. The same system can then be utilized to track the replacement or repaired blade so that it can be adjusted until it describes a common plane of rotation with the remaining blades of the rotor. This eliminates the need for additional supporting equipment on the ground and any unnecessary delay in the tracking of the blades of the helicopter.

Tracking systems that are mounted directly to the fuselage of a helicopter have been provided in the past to determine the relative tracking positions of the whirling blades while the helicopter is either on the ground or in flight. One such system provides an optical device which permits rays of ambient light from two directions to impinge upon a light sensitive element such as a photoelectric cell. The system is mounted to the back of the fuselage of the helicopter directly below the tips of the blades of a single rotor helicopter or below the overlap of the planes of rotation of the blades of a tandem rotor helicopter so that the rays of ambient light pass through the path of rotation of all the blades.

When the ambient light rays are blocked by a passing blade, the photoelectric cell emits a signal indicating the interruption of the rays by the blade. Successive interruption of the pair of ambient light rays by any one blade produces a pair of signals from the photoelectric cell which are applied to an electronic circuit that records the time interval between the two signals.

Since the relative or parallax angle between the sensed rays of ambient light is fixed and determinable and the speed of the rotor is known, the time interval recorded is a function of the approximate height of the particular rotating blade with respect to a given plane of reference. When one blade is describing a plane of rotation dissimilar to the planes of rotation of the other blades of the rotor system, this situation can be detected by the system and subsequently rectified, thereby placing all of the blades "in track" and preventing unbalance in the helicopter rotor system.

Such tracking systems, however, are dependent upon a source of light from the sun or sky for operation, because they make use of and are dependent upon ambient light. Sunlight is variable, and on cloudy days and times of extreme weather conditions, such as rain or fog, the amount of sunlight available is often insufficient to generate the required change in the electrical signal. This restricts the use of these prior art systems to only bright, sunny days, while constant monitoring of the blades during flight is required at all times including nighttime and under all weather conditions.

The dependency of such a system on available ambient light is not only itself a disadvantage, but it also leads to inaccurate results because any sudden change in the intensity of the ambient light can change the signal output of the cell without an actual interruption of the ambient light rays by a blade. Thus during daylight operation, any sudden decrease in ambient light can cause the photoelectric cell to emit an electrical signal even though there has not been any interruption of the rays by a blade.

Accordingly, it is the primary object of this invention to provide an improved aircraft mounted blade tracking system for monitoring the displacement characteristics of whirling blades.

Another object of this invention is to provide an improved aircraft mounted blade tracking system for more accurately measuring the displacement characteristics of the rotating blades.

Another object of this invention is to provide an improved system suitable for tracking rotating blades either while the aircraft is in flight or while it is on the ground, which system is capable of tracking the blades under most weather conditions and at any time of the day or night.

Another object of this invention is to provide a tracking system for indicating the vertical displacement characteristics of rotating blades using a single source of energy emitting a finely controlled beam of energy.

A further object of this invention is to provide a system for monitoring and measuring the tracking characteristics of rotating helicopter blades which can be effectively used while the helicopter is in flight and which is independent of ambient light conditions.

Yet a further object of one embodiment of this invention is to provide an optical tracking system for use on a helicopter in flight which utilizes a single source of coherent light emitting a beam of constant intensity and capable of penetrating most weather conditions including fog, smoke, and snow without degradation or divergence over the distance required to permit tracking of the blades.

Still a further object of one embodiment of this invention is to provide an optical system for tracking the whirling blades of a helicopter either while it is on the ground or in flight, wherein the vertical displacement characteristics of the blades are a function of the angular direction of a light beam aligned with a light sensitive element located within the plane of rotation of the outboard end of each blade.

Another object of one embodiment of this invention is to provide an optical tracking system for helicopter blades which is operable either while the aircraft is in flight or on the ground, wherein the vertical displacement between a pair of whirling blades is a function of the difference in angular adjustment of a light beam between alignment of the beam with the light sensitive elements located in each individual blade.

Another object of this invention is to provide an improved aircraft mounted tracking system for monitoring and measuring the displacement characteristics of rotating helicopter blades that is operable internally of the helicopter, which system is inexpensive to manufacture and maintain, is simplified in construction and operation, and is extremely accurate and highly reliable.

Additional objects and advantages of the invention will be set forth in part in the description which follows and in part will be obvious from this description or may be learned by the practice of the invention, the objects and advantages being realized and attained by means of the instrumentalities and combinations that are particularly pointed out in the appended claims.

To achieve these foregoing objects and in accordance with the purpose of this invention, the blade tracking system of this invention comprises a source of energy that is mounted to the fuselage of the aircraft and projects a beam of energy into the planes of rotation of the blades. A signal generating energy responsive element is mounted on the underside of each blade, preferably near the outboard end of the blades, to receive the energy beam. The element is in alignment with the angularly directed beam of energy, and a signal is generated, only when the blade is describing a particular plane of rotation. Indicating means may further be provided to indicate the angular direction of the beam necessary to achieve alignment, the angular direction of the beam being a function of the displacement characteristics of the rotating blades.

While any defined energy beam, including light, sound, or force beams, is contemplated for use in the blade tracking system of this invention, the preferred energy beam is a finely controlled and coherent beam of light.

The invention consists in the novel parts, constructions, arrangements, combinations, and improvements as shown and described.

The accompanying drawings which are incorporated in and constitute a part of this specification, illustrate several embodiments of the invention and, together with this description, serve to explain the principles of this invention.

It is to be understood that the foregoing general description and the following detailed description are exemplary and explanatory but are not restrictive of the invention.

Reference will now be made in detail to the present preferred embodiments of the invention, examples of which are illustrated in the accompanying drawings.

Figure 1:
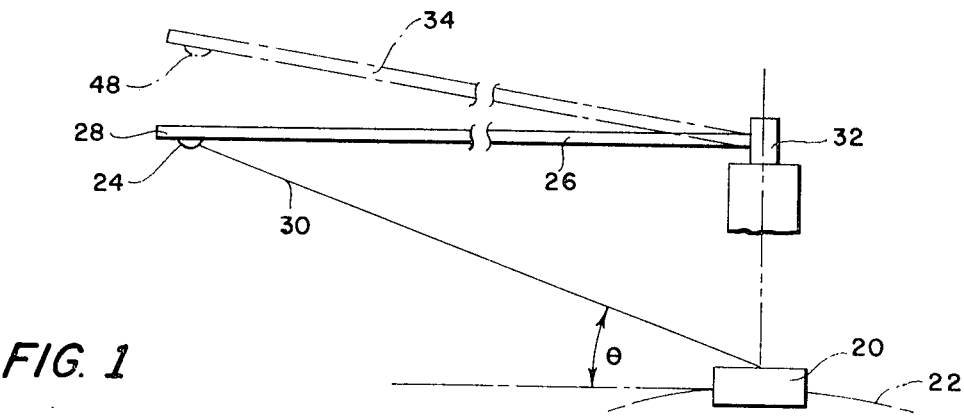
FIG. 1 is a schematic view of the tracking system of this invention.

As shown in FIG. 1, the tracking system of this invention comprises a light source 20 mounted to an aircraft 22, and a light sensitive element 24 mounted to the underside of a blade 26, preferably at or near the tip or outboard end 28 of blade 26. A light beam 30 is emitted from the light source 20 and directed upwardly into and through the plane of rotation of blade 26 at an angle $\theta$ with respect to the horizontal. Blade 26 is suitably connected to a rotor hub 32 of aircraft 22 for rotatable movement.

As blade 26 whirls around, it intersects light beam 30 once during every revolution. Light beam 30 is intersected by blade 26 at the exact location of light sensitive element 24 only when the blade is describing a specific plane of rotation relative to the angular direction of light beam 30. At the instant of intersection, if light beam 30 is received by element 24, an electrical signal is generated, which indicates that the blade is whirling in that specific plane of rotation.

If a blade is out of track and is describing a plane of rotation other than the desired plane of rotation (e.g., the plane described by blade 26) and light beam 30 is at the desired angle θ to cause intersection with the element only when it is in the desired plane, the beam of light does not impinge upon the light sensitive element in the blade, which is out of track, when it intersects the light beam. Blade 34, for example, as shown in phantom in FIG. 1, is tracking out of the desired plane of rotation, and therefore light beam 30 does not impinge upon light sensitive element 48 in the blade and no electrical signal is generated, which indicates that adjustment of the rotating characteristics of the blade is required.

In practical usage, rather than adjusting a blade until the light sensitive element on the blade is in alignment with a fixed light beam, blades are more commonly adjusted by determining the actual vertical displacement of the plane of rotation of the blade with respect to an established or optimum plane of reference, such as the plane of rotation of a master blade.

Figure 2:
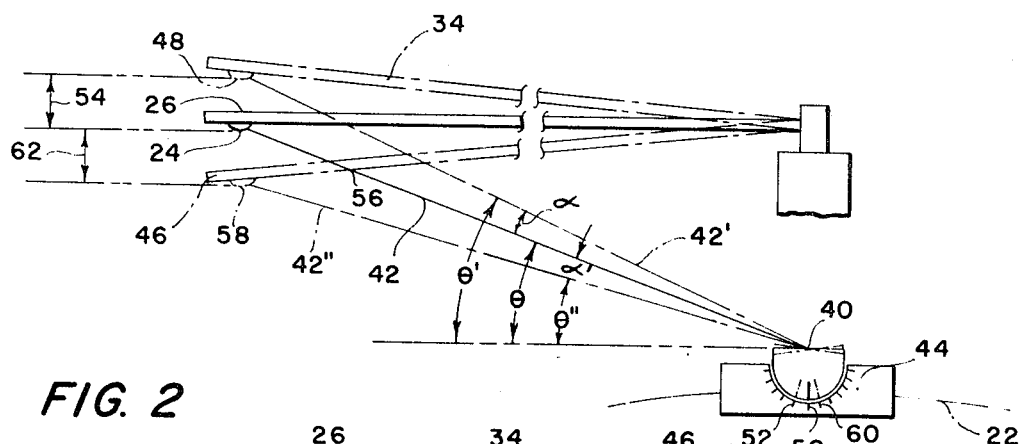
FIG. 2 is a schematic view of the tracking system of this invention showing the relative positions of the blades of a three-bladed rotor in an unbalanced position.

Therefore, in accordance with this invention and as shown in FIG. 2, a system is provided for indicating the vertical displacement of the plane of rotation of a blade from an optimum plane of reference. As embodied, this system comprises a light source 40 that is pivotally mounted with respect to the fuselage of aircraft 22 and is adapted to vary the angle θ between light beam 42 emitted from the light source 40 and the longitudinal axis of the helicopter. Additionally, means are provided for indicating either or both the magnitude of angle θ necessary to achieve alignment with the light sensitive element in a blade and the angular displacement of light beam 42 necessary to achieve alignment with the light sensitive elements in any two blades. As shown schematically in FIG. 2, this means can comprise a protractor 44. It is to be understood, however, that any means comprising a more sophisticated system for indicating the degree of angular displacement of the light beam on the control panel of the cockpit of the helicopter or at any other suitable place is contemplated for use in this invention.

In the embodiment shown in FIG. 2, two rotor blades 34 and 46 are tracked with respect to the desired plane of rotation of the blades, such as that described by blade 26, which may be, for example, a reference or master blade. In the comparison techniques of this invention, when all the blades are rotating at the same speed, the difference in the angular displacement of light beam 42 necessary to align the beam with the light sensitive element on a blade rotating at the desired plane of rotation and to align the beam with the light sensitive element in every other blade is a function of the vertical distance between the paths of rotation of the blades.

When light source 40 is set at angle θ so that it intersects blade 26 at the exact location of light sensitive element 24, an electrical signal will be generated once during every revolution of blade 26 at the instant when the light beam impinges on element 24. Blade 34 in the rotor system, however, has a plane of rotation above that of blade 26, and therefore light sensitive element 48 located in blade 34 is not in alignment with light beam 42.

To align the light beam with the element in blade 34, the angular direction of the light beam must be adjusted to an angle θ′ so that light beam 42′ intersects the path of rotation of blade 34 at the exact location of light sensitive element 48′ generating an electrical signal.

The difference between the reading on protractor 44 when light beam 42 is at angle θ, shown at mark 50, and the reading when light beam 42 is adjusted to angle θ′, shown at mark 52, is indicative of the angular displacement α(θ′−θ) of the light beam. The determination of this angular displacement allows the determination of the vertical distance 54 between the planes of rotation of blades 26 and 34. The necessary adjustments in blade 34 can then be made until the blade achieves the desired plane of rotation, with element 48 then intersecting light beam 42 directed at angle θ and producing an electrical signal.

As shown in FIG. 2, the third blade 46 is also out of track and has a plane of rotation below blade 26 intersecting light beam 42 at 56 without the generation of an electrical signal from the light sensitive element 58 located on the underside of blade 46. To track this blade, light source 40 is adjusted to an angle θ″ until light beam 42″ is aligned with light sensitive element 58 in blade 46, with the difference between mark 60 and mark 50 on protractor 44 being indicative of the angular displacement α′(θ−θ″) between beam 42 and beam 42″. From the angle α′ the vertical distance 62 between the plane of rotation of blade 26 and that of blade 46 can be calculated, and the necessary adjustments made in blade 46 until it describes a plane of rotation common to that of blade 26.

When all of the blades track in a common plane of rotation, the angular direction of the light beam is the same, because the light sensitive elements are all mounted in the same location on the individual blades and an electrical signal is generated every time a blade intersects the light beam. Thus, when a three-bladed rotor is being tested, three signals within the time span of one revolution of the rotor indicates that all the blades are tracking in a common plane of rotation. If a lesser number of signals is received within the time span of one revolution of the rotor, this indicates that all the blades are not in track.

Figure 3:
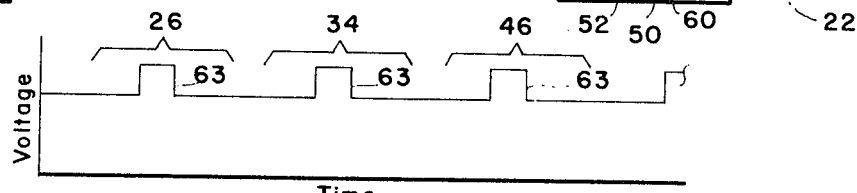
FIG. 3 is a diagrammatic illustration of the electrical signals generated by the system when all the blades are "in track."

The electrical signals received from the light sensitive elements of the three-bladed rotor of FIG. 2 are diagrammatically illustrated in FIG. 3. When all the blades are in the desired plane of rotation and the light beam is set at the proper angle θ, the electrical signals 63 emitted from the light sensitive elements on the blades form a graphic illustration of the type shown in FIG. 3.

Figure 4:
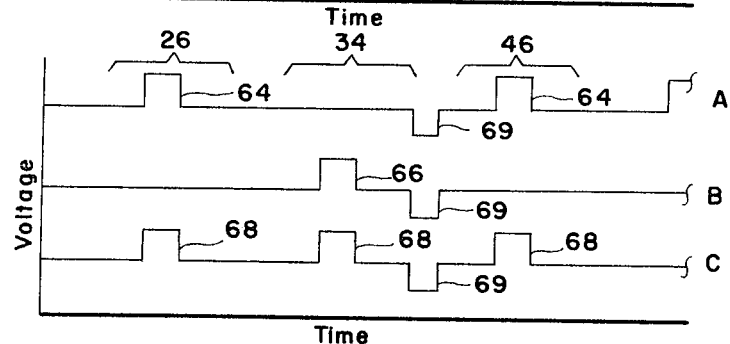
FIG. 4 is a diagrammatic illustration of the electrical signals generated by the system when one of the blades is unbalanced and out of track.

When blade 34, for example, is out of track and the angular direction of the light beam remains at angle θ, the electrical signals 64 received from the light sensitive elements on the blades form a graphic illustration, as shown in line A of FIG. 4. It will be noted by comparison to FIG. 3 that an electrical signal is missing, indicating that one of the blades is out of track. Adjustment of the light beam is then made until an electrical signal 66 is received from light sensitive element 48 in blade 34, as shown in line B of FIG. 4. When this electrical signal is received, indicating alignment between light beam 42′ and light sensitive element 48 in blade 34, the vertical displacement 54 between the plane of rotation of blade 34 and the desired plane of rotation is then calculated as a function of the angular displacement α.

Blade 34 can then be adjusted until it describes the desired plane of rotation, with the blades producing a pattern of electrical signals 68, as shown in line C of FIG. 4, which is similar to the pattern shown in FIG 3, and indicates that all the blades are in track.

In accordance with the invention, suitable phasing means are provided which emit a reference pulse 69, diagrammatically illustrated in lines A–C of FIG. 4. This reference pulse is emitted once during every revolution of the rotor and ensures correct phasing of the system by allowing each electrical signal received to be related to a particular blade of the rotor. The phasing means will be described with more particularity below.

Figure 5:
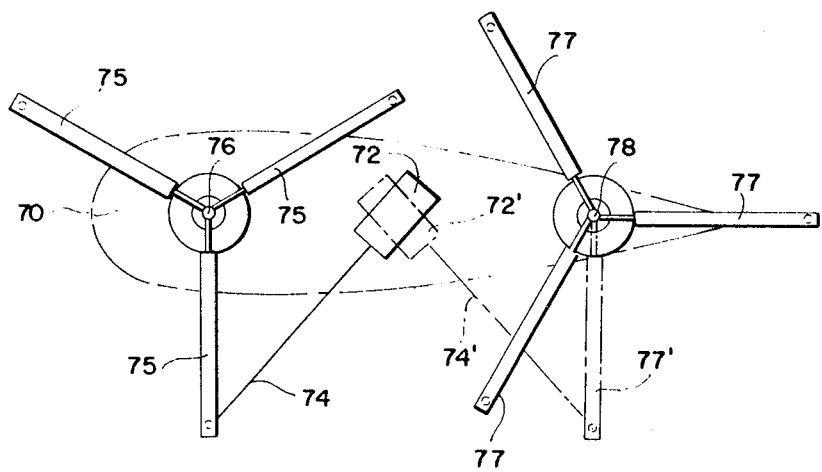
FIG. 5 is a plan view of an embodiment of the tracking system of this invention showing its operation on a tandem rotor helicopter.
Figure 6:
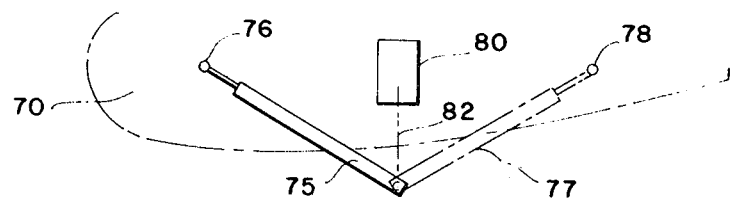
FIG. 6 is a fragmentary plan view of an alternative embodiment of the tracking system of this invention showing its operation on a tandem rotor helicopter.

Specific embodiments of the invention similar to that schematically illustrated in FIG. 2 are illustrated in FIGS. 5 and 6. The tracking systems shown in these figures are capable of tracking all the blades of a three-bladed tandem rotor system for a conventional helicopter 70. The illustration of such a helicopter is by way of example only, since helicopters with single rotor systems or rotors of more or less number of blades lend themselves equally well to the system of this invention for blade tracking.

In the embodiment illustrated in FIG. 5, a light source 72 is mounted on the top of the fuselage of helicopter 70 and preferably half way between fore rotor 76 and aft rotor 78. Light source 72 is mounted for rotational movement about an axis parallel to the axis of the rotors and also for angular adjustments so that the angle of light beam 74 can be adjusted with respect to the helicopter or the ground.

After all of the blades 75 of fore rotor 76 have been tracked in accordance with the same procedure as described above in connection with FIG. 2, the light source is rotated to the position 72′ shown in phantom in FIG. 5. The light source then directs light beam 74′ into the path of rotation of the blades 77 of aft rotor 78, and the same procedure is carried out with all of these blades when they are in the position as shown by blade 77′ in phantom in FIG. 5. This system permits all the planes of rotation of the individual blades of the tandem rotor system to be determined and adjustments to be made, if necessary, so that all the blades of the rotor system have the desired plane of rotation.

A further specific embodiment of the invention is illustrated in FIG. 6. In this embodiment, the blades 75 and 77 of the fore and aft rotors, respectively, are tracked at the point where they intersect a common vertical plane so that the light source 80 emitting a light beam 82 need only be angularly adjustable with respect to the helicopter or the ground and need not rotate between two positions, as in the embodiment shown in FIG. 5. Since the blades of the fore and aft rotors are staggered, only one blade at a time will intersect light beam 82, the blades of the fore rotor alternating with the blades of the aft rotor. Suitable phasing means of the type described above are provided with this embodiment of the invention for phasing the electrical signals received from all the blades.

Hence, if all of the blades 75 of the fore rotor 76 are in a common plane of rotation and intersect the light beam at the desired angle, the light sensitive element of each blade will be in alignment with the light beam and generate three electrical signals in each revolution of the rotor. If less than three signals are received, this indicates that a particular blade is out of track, and the vertical displacement of the deflected blade from the common plane of rotation is determined by angular adjustment of the light source by the procedure described above.

Similarly, angular adjustment of the light source to the desired angle for intersection of the light beam with the common plane of rotation of the blades 77 of aft rotor 78 generates three additional electrical signals for each revolution of the rotor.

If a blade 75 of the fore rotor happens to be out of track and is describing a plane of rotation common to the plane of rotation of aft blades 77, this situation is indicated by the phasing means which will indicate that the signal received from such a source is out of phase with the other signals received from the aft rotor, and hence is extraneous.

Figure 7:
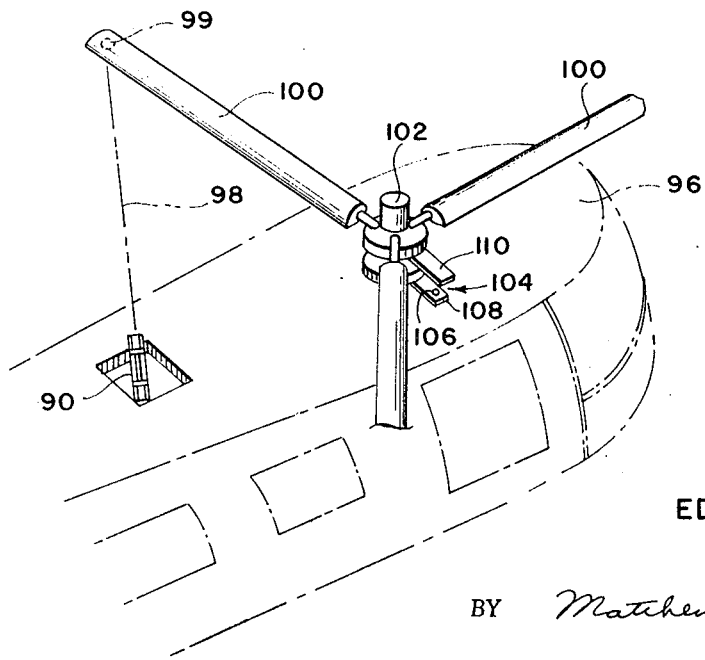
FIG. 7 is a perspective view of the tracking system of FIG. 5 showing its relationship with the fore rotor of the helicopter.

In accordance with the invention, a source of light is provided which permits consistent and accurate measurement of the degree of angular displacement of the light beam independent of ambient light and most weather conditions. As embodied, this light source comprises a finely controlled source of coherent light having a beam of very small diameter, with a minimum of divergence over the distance required for it to travel between the source of light and the light sensitive element. A preferred light source is a laser 90, as shown in FIG. 7, which is adaptable to the tracking systems shown in FIGS. 5 and 6, but is illustrated in use with the tracking system of FIG. 5.

A laser beam is a controlled source of light of coherent wavelengths, wherein the waves of light emitting from the device are all in phase. The light is directional and follows a path exactly along the axis of the laser. A laser provides a fine monochromatic light beam which has negligible diffusion over the distance it is required to travel. It is capable of penetrating the worst weather conditions that may be encountered in tracking, such as fog, smog, snow, or the like.

A laser suitable for use in this invention may be, for example, a helium-neon gas continuous wave laser fitted with an aperture to provide a beam of approximately 0.1 inch in diameter.

The laser 90 is suitably mounted to the fuselage of helicopter 96, directing a coherent beam of light 98 outwardly and upwardly to intersect the planes of rotation of blades 100 of fore rotor 102.

In accordance with the invention, a light sensitive element 99 is mounted near the tip of each blade and is capable of generating a change in an electrical signal whenever the light beam is aligned with the element. The light sensitive element may be a photoelectric cell emitting an electrical signal when the beam of light is intersected and impinges upon the cell, or it may act as a gate preventing passage of an electrical signal when the beam of light is intersected and impinges upon the cell.

As embodied, the light sensitive element is preferably a photodiode which is a semiconductor having electrical characteristics that are light sensitive and has an aperture diameter of about 0.1 inch. The photodiodes are normally housed in a container designed to collect and focus the light received. When they are illuminated, the current generated is proportional to the amount of light falling on the diode, and therefore the photodiodes are not only capable of detecting the presence of light but can also be used to measure light intensity.

In a preferred embodiment of the invention, a lens is mounted over the surface of the diode to collect the light and focus it on the sensitive diode without regard to the angular direction of the light with respect to the axis of the diode.

The light sensitive element 99 in each blade is electrically connected through wire leads running the length of the blade to a slip ring (not shown) mounted about rotor 102. An electronic unit (not shown) is mounted within the helicopter and electrically connected to the slip rings to indicate the signals generated by elements 99.

Phase detector 104 may be of any conventional type well gnown to those skilled in the art and forms no part of the invention. A suitable phase detector, as shown in FIG. 7, includes a magnetic pickup 106 comprising a coil wound magnet mounted to a bracket 108 on the stationary housing of the rotor. A magnetic impulse bracket 110 is secured to the rotor so that as it passes over pickup 106, a signal pulse 69 is emitted, as shown schematically in FIG. 4, and because the location of the bracket with respect to the blades is known, the phase of the blades can be correlated with the signals from the light sensitive elements in the blades.

It is to be understood, of course, that even a tandem rotor helicopter only one phase detector means for the tracking system is required, since the blades of the fore and aft rotor always maintain the same relationship with respect to one another.

Any suitable electrical connecting means or mechanical transmission means may be used with respect to the laser 90 to indicate to the operator the angular direction of light beam 98 necessary to achieve alignment with the light sensitive element in each blade. Any suitable means may also be provided for automatically changing the angular direction of the light beam, either from inside or outside the helicopter. A readout unit conventionally integrates the changes in electrical signals from the light sensitive elements and the phase detector, with the angular displacement of the light beam to indicate directly the vertical displacement of any blade with respect to an established or common plane of reference.

While the system has been described for use in tracking blades to determine their plane of rotation so that they can be adjusted to the desired plane of rotation, the system is also capable of monitoring the tracking characteristics of rotating blades while in flight.

Hence, during flight the pilot can continuously monitor a readout mechanism suitably placed in the cockpit to determine if all of the blades are correctly describing a common plane of rotation. If one of the blades happens to go out of track, this is indicated in the system of this invention by a missing electrical signal over the time span of one revolution of the rotor, even though the unbalance in the rotor system may be imperceptible to the operator.

Suitable mechanisms can be provided on the rotor of the helicopter for appropriately adjusting the defective blade, and the achievement of the proper plane of rotation can be detected by the reappearance of a signal from that blade on the read out mechanism. If such adjustment is not provided for or if the blade is damaged beyond adjustment, the helicopter may have the defective blade replaced. The new blade can then be tracked in comparison with the common plane of rotation of the old blades of the rotor in accordance with the above described procedure so that it too describes the proper plane of rotation.

In accordance with the invention, a new, improved, and precise system for monitoring the paths of rotation of whirling helicopter blades and for measuring the vertical displacements of such whirling blades has been provided. his system is mounted to the aircraft and utilizes a single and finely controlled light beam that passes through the plane of rotation of the blades at a specific angle.

The system is designed to operate either when the ship is on the ground or in flight, and it is independent of surrounding conditions, both as to variations in ambient light and most types of weather. This system makes it unnecessary to provide external light sources, and hence the tracking of the blades can be reliably and accurately carried out at any time of the day or night.

The invention in its broader aspect is not limited to the specific details shown and described, but departures may be made from such details within the scope of the accompanying claims without departing from the principles of the invention and without sacrificing its chief advantages.

What is claimed is:

1. A device for tracking rotating blades of an aircraft comprising: a source of energy transmitting a defined beam of coherent energy across the paths of rotation of the blades; a signal generating energy responsive element mounted on each blade to receive the energy beam directed at a given angle with respect to an established plane of reference, parallel to the plane of rotation of the blade, when the blade is describing a particular plane of rotation with respect to said plane of reference, said energy responsive element producing a signal upon its alignment with the beam and means for receiving and correlating the signals so produced, whereby the displacement characteristics of a blade with respect to the established plane of reference can be determined.

2. The tracking device of claim 1, wherein the source of energy emits a beam of coherent light and the energy responsive element is a signal generating light sensitive element.

3. The device of claim 2, wherein the light source is angularly adjustable in a plane normal to the established plane of reference and which includes means for indicating the angular direction of the light beam upon alignment of the beam with the element on the blade as a function of the displacement characteristics of the plane of rotation of the blade with respect to the plane of reference.

4. The device of claim 3, for tracking rotating helicopter blades, wherein the plane of reference is normal to the axis of rotation of the blades and the angularly adjustable light source is mounted on the fuselage of a helicopter and directs the beam of light in a plane parallel to said axis in a direction outwardly and upwardly from the fuselage and into the paths of rotation of the blades.

5. The device of claim 4, wherein the light source is mounted between the rotor systems of a tandem rotor helicopter and directs the light beam outwardly and upwardly from the fuselage in a vertical plane that is normal to the longitudinal axis of the helicopter so that it intersects the paths of rotation of the blades of both rotor systems in the same vertical plane.

6. The device of claim 4, wherein the light source is rotatably mounted to the fuselage about a substantially vertical axis between the rotor systems of a tandem rotor helicopter, so that the beam of light intersects the paths of rotation of the blades of only one rotor system at any given time, but can be rotated to intersect the paths of rotation of the blades of either rotor system.

7. The device of claim 3, wherein the indicating means indicates the angular displacement of the light beam between its alignment with the light sensitive element on any two blades as a function of the vertical displacement between the planes of rotation of the two blades.

8. The tracking device of claim 2, wherein the source of light is a laser light.

9. The tracking device of claim 8, wherein the laser is a helium-neon gas laser having a light beam diameter of approximately 0.1 inch.

10. The tracking device of claim 4, wherein the light sensitive element is a photodiode mounted to the underside of the helicopter blades near the outboard end of said blades, said photodiode having an aperture diameter of about 0.1 inch.

11. The device of claim 3, wherein the signal receiving means includes phasing means comprising a reference signal to indicate the signal associated with each blade, said signal receiving means plotting the electrical signals received from the light sensitive elements and the reference signal as a function of time.

References Cited

UNITED STATES PATENTS

| | | | |
|---|---|---|---|
| 2,042,174 | 5/1936 | Foisy | 273—101.1 |
| 2,077,383 | 4/1937 | Foisy | 273—101.1 |
| 2,455,053 | 11/1948 | Flint | 356—167 |
| 2,964,849 | 12/1960 | Roccati | 356—23 |
| 3,002,420 | 10/1961 | Willits et al. | 356—152 |
| 3,012,468 | 12/1961 | Magill et al. | 356—138 |
| 3,023,317 | 2/1962 | Willits et al. | 356—167 |

RONALD L. WIBERT, Primary Examiner

J. ROTHENBERG, Assistant Examiner

U.S. Cl. X.R.

170—160.22; 250—215